US011005732B1

(12) United States Patent
Quevedo et al.

(10) Patent No.: US 11,005,732 B1
(45) Date of Patent: May 11, 2021

(54) METHODS FOR IMPROVED SERVICE CHAIN CLASSIFICATION AND MANAGEMENT AND DEVICES THEREOF

(71) Applicant: F5 Networks, Inc., Seattle, WA (US)

(72) Inventors: Mark Quevedo, Seattle, WA (US); Saxon Amdahl, Portola Valley, CA (US)

(73) Assignee: F5 NETWORKS, INC., Seattle, WA (US)

( * ) Notice: Subject to any disclaimer, the term of this patent is extended or adjusted under 35 U.S.C. 154(b) by 4 days.

(21) Appl. No.: 16/110,839

(22) Filed: Aug. 23, 2018

Related U.S. Application Data

(60) Provisional application No. 62/549,211, filed on Aug. 23, 2017.

(51) Int. Cl.
| | | |
|---|---|---|
| *H04L 12/24* | (2006.01) | |
| *H04L 29/06* | (2006.01) | |
| *H04L 12/721* | (2013.01) | |

(52) U.S. Cl.
CPC .......... *H04L 41/5041* (2013.01); *H04L 45/38* (2013.01); *H04L 63/0428* (2013.01); *H04L 63/166* (2013.01); *H04L 67/42* (2013.01)

(58) Field of Classification Search
CPC . H04L 41/5041; H04L 45/38; H04L 63/0428; H04L 63/166
See application file for complete search history.

(56) References Cited

U.S. PATENT DOCUMENTS

| | | | | |
|---|---|---|---|---|
| 7,639,613 B1* | 12/2009 | Ghannadian | .......... | H04L 43/026 370/232 |
| 2010/0054142 A1* | 3/2010 | Moiso | .................. | H04L 67/327 370/252 |
| 2015/0195197 A1* | 7/2015 | Yong | .................... | H04L 45/306 370/392 |

(Continued)

OTHER PUBLICATIONS

F5 Networks, Inc., "BIG-IP® Local Traffic Management: Basics", Manual, May 9, 2016, 58 pages, Version 12.1, F5 Networks, Inc., Retrieved from the Internet: <https://support.f5.com/kb/en-us/products/big-ip_ltm/manuals/product/ltm-basics-12-1-0.html>.

(Continued)

*Primary Examiner* — Christopher B Robinson
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that identify a first service based on inspection of a message received from a server. The message is associated with a flow between a client and the server. The first service is incorporated in, or removed from a service chain associated with the flow. The message, or other received network traffic associated with the flow, is then steered according to the service chain. With this technology, network traffic can advantageously be processed and steered according to services within a service chain that more accurately reflect the communications occurring within particular flows with this technology. In particular, service chains for flows can advantageously be established or modified to account for server-speaks-first protocols, as well as protocols that may be used inside secure or encrypted connections.

20 Claims, 5 Drawing Sheets

(56) References Cited

U.S. PATENT DOCUMENTS

| | | | | |
|---|---|---|---|---|
| 2015/0334094 | A1* | 11/2015 | Suresh | H04L 45/74 713/153 |
| 2016/0182684 | A1* | 6/2016 | Connor | G06F 9/45558 709/203 |
| 2017/0094002 | A1* | 3/2017 | Kumar | H04L 67/2861 |
| 2017/0149632 | A1* | 5/2017 | Saltsidis | H04L 41/0668 |
| 2017/0317932 | A1* | 11/2017 | Paramasivam | H04L 67/02 |
| 2017/0317936 | A1* | 11/2017 | Swaminathan | H04L 47/20 |

OTHER PUBLICATIONS

F5 Networks, Inc., "BIG-IP® Device Service Clustering: Administration", Manual, Jul. 15, 2016, 124 pages, Version 12.0, F5 Networks, Inc., Retrieved from the Internet: <https://support.f5.com/kb/en-us/products/big-ip_ltm/manuals/product/bigip-device-service-clustering-admin-12-0-0.html>.

F5 Networks, Inc., "BIG-IP® Local Traffic Management: Getting Started with Policies", Manual, Dec. 28, 2017, 32 pages, Version 12.1, F5 Networks, Inc., Retrieved from the Internet: <https://support.f5.com/kb/en-us/products/big-ip_ltm/manuals/product/local-traffic-policies-getting-started-12-1-0.html>.

F5 Networks, Inc., "TMOS: Operations Guide", Manual, Apr. 2018, 229 pages, F5 Networks, Inc., Retrieved from the Internet: <https://support.f5.com/kb/en-us/products/big-ip_ltm/manuals/product/f5-tmos-operations-guide.html>.

F5 Networks, Inc., "BIG-IP® Analytics: Implementations", Manual, Jan. 10, 2018, 58 pages, Version 12.1, F5 Networks, Inc., Retrieved from the Internet: <https://support.f5.com/kb/en-us/products/big-ip_analytics/manuals/product/analytics-implementations-12-1-0.html>.

F5 Networks, Inc., "BIG-IP® System: SSL Administration", Manual, Jul. 22, 2016, 110 pages, Version 12.1, F5 Networks, Inc., Retrieved from the Internet: <https://support.f5.com/kb/en-us/products/big-ip_ltm/manuals/product/bigip-ssl-administration-12-1-0.html>.

F5 Networks, Inc., "BIG-IP® TMOS®: Routing Administration", Manual, Jul. 22, 2016, 124 pages, Version 12.1, F5 Networks, Inc., Retrieved from the Internet: <https://support.f5.com/kb/en-us/products/big-ip_ltm/manuals/product/tmos-routing-administration-12-1-0.html>.

* cited by examiner

METHODS FOR IMPROVED SERVICE CHAIN CLASSIFICATION AND MANAGEMENT AND DEVICES THEREOF

This application claims the benefit of U.S. Provisional Patent Application Ser. No. 62/549,211 filed Aug. 23, 2017, which is hereby incorporated by reference in its entirety.

FIELD

This technology generally relates to network traffic management and, more particularly, to improved service chain classification and management for network traffic flows.

BACKGROUND

Many networks employ network traffic management devices that provide security services, load balancing, and/or application acceleration, for example, among many other types of services. Network traffic management devices can operate in a full proxy mode in which connections from clients are terminated and separate server connections are initiated for a particular flow.

Services can be provided by network traffic management device for a flow, as part of a service chain that can utilize local services as well as third party services that may be hosted externally. Exemplary services can include Internet content adaptation protocol (ICAP), data loss prevention (DLP), e-mail, firewall, antivirus, and video compression services, although many other types services can be utilized.

Currently, flows are classified in order to establish a service chain based on an initial communication received from a client. Accordingly, flows are classified based on contextual information, such as time of day or port number on which the traffic originating from the client was received, for example. Since flows are classified based on the first message received from a client, flow classification does not operate effectively when the traffic relates to certain protocols, often referred to as server-speaks-first protocols (e.g., simple mail transfer protocol (SMTP)).

Further, flow classification is ineffective for flows in which protocols are layered, such as when SMTP communications, for example, are encrypted using a transport layer security (TLS) protocol. Even further, current flow classification is not dynamic and does not consider feedback from various services within a service chain that could be used to modify the service chain associated in order to optimize the processing of network traffic associated with a flow.

SUMMARY

A method for improved service chain classification and management implemented by a network traffic management system comprising one or more network traffic management apparatuses, service devices, client devices, or server devices, the method including identifying a first service based on inspection of a message received from a server. The message is associated with a flow between a client and the server. The first service is incorporated in, or removed from a service chain associated with the flow. The message, or other received network traffic associated with the flow, is then steered according to the service chain.

A network traffic management apparatus, comprising memory comprising programmed instructions stored thereon and one or more processors configured to be capable of executing the stored programmed instructions to identify a first service based on inspection of a message received from a server. The message is associated with a flow between a client and the server. The first service is incorporated in, or removed from a service chain associated with the flow. The message, or other received network traffic associated with the flow, is then steered according to the service chain.

A non-transitory computer readable medium having stored thereon instructions for improved service chain classification and management comprising executable code that, when executed by one or more processors, causes the one or more processors to identify a first service based on inspection of a message received from a server. The message is associated with a flow between a client and the server. The first service is incorporated in, or removed from a service chain associated with the flow. The message, or other received network traffic associated with the flow, is then steered according to the service chain.

A network traffic management system comprising one or more network traffic management apparatuses, service devices, client devices, or server devices, memory comprising programmed instructions stored thereon, and one or more processors configured to be capable of executing the stored programmed instructions to identify a first service based on inspection of a message received from a server. The message is associated with a flow between a client and the server. The first service is incorporated in, or removed from a service chain associated with the flow. The message, or other received network traffic associated with the flow, is then steered according to the service chain.

This technology has a number of associated advantages including providing methods, non-transitory computer readable media, network traffic management apparatuses, and network traffic management systems that facilitate improved service chain classification and management. With this technology, network traffic can advantageously be processed and steered according to services within a service chain that more accurately reflect the communications occurring within particular flows with this technology. In particular, service chains for flows can advantageously be established or modified to account for server-speaks-first protocols, as well as protocols that may be used inside secure or encrypted connections.

DETAILED DESCRIPTION

Figure 1:
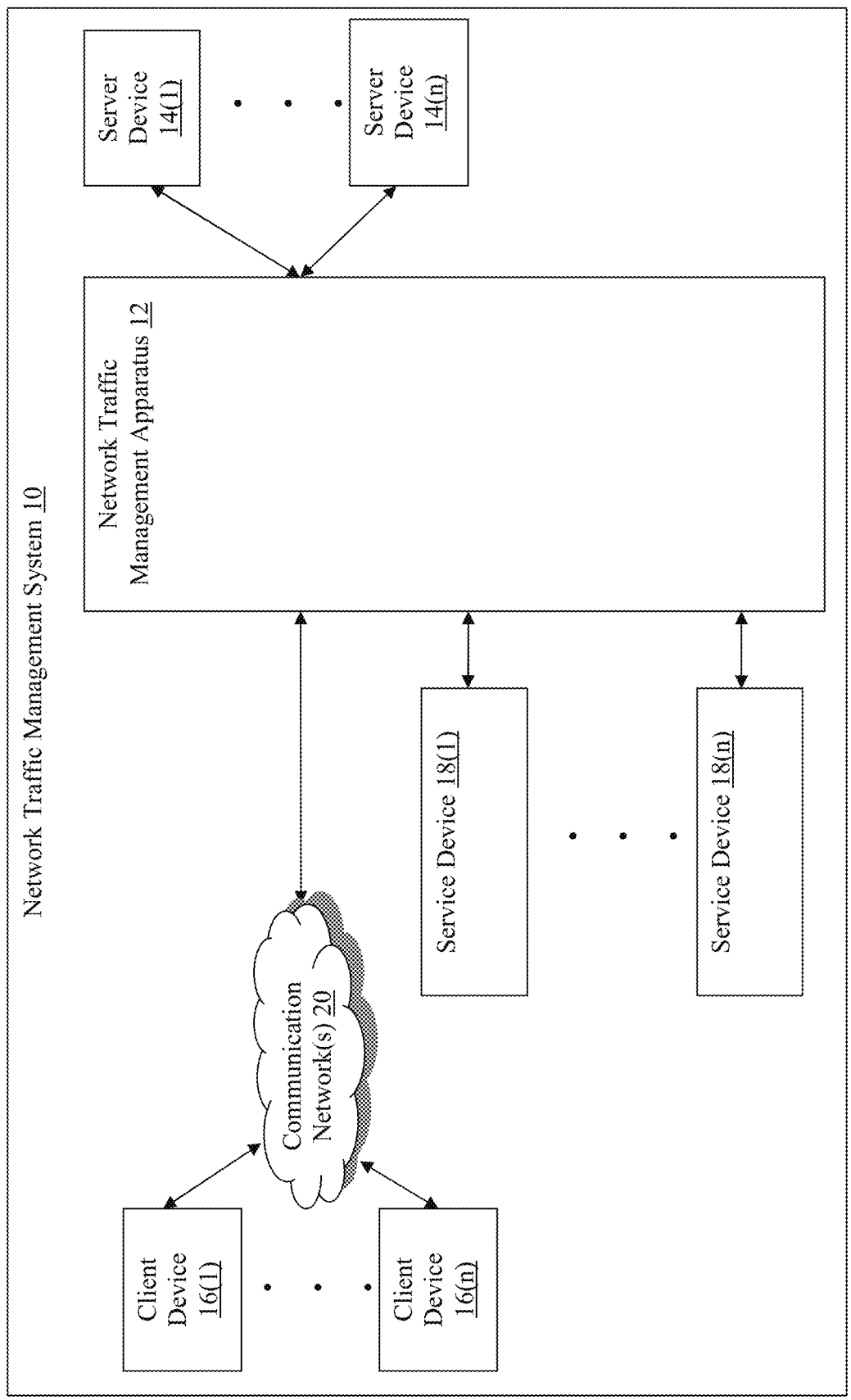
FIG. 1 is a block diagram of an exemplary network traffic management system with a network traffic management apparatus.

Referring to FIG. 1, an exemplary network environment which incorporates an exemplary network traffic management system 10 is illustrated. The network traffic management system 10 in this example includes a network traffic management apparatus 12 that is coupled to server devices 14(1)-14(n), client devices 16(1)-16(n), and service devices 18(1)-18(n) via communication network(s) 20, although the network traffic management apparatus 12, server devices 14(1)-14(n), client devices 16(1)-16(n), and/or service devices 18(1)-18(n) may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, network traffic management systems, and network traffic management apparatuses that facilitate more effective, dynamic service chain classification in order to optimize the handling of network communications.

Figure 2:
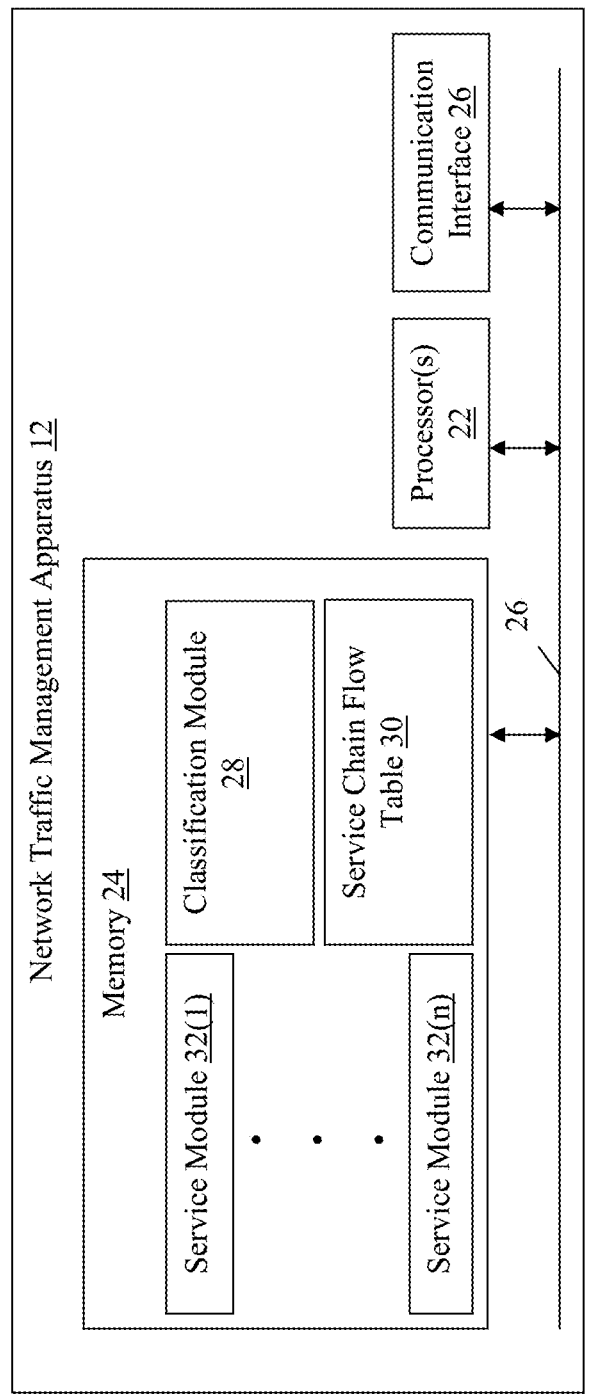
FIG. 2 is a block diagram of an exemplary network traffic management apparatus.

Referring to FIGS. 1-2, the network traffic management apparatus 12 of the network traffic management system 10 may perform any number of functions in addition to service chain classification including managing network traffic, load balancing network traffic across the server devices 14(1)-14(n), and/or accelerating network traffic associated with web applications hosted by the server devices 14(1)-14(n). The network traffic management apparatus 12 includes processor(s) 22, memory 24, and/or a communication interface 26, which are coupled together by a bus 26 or other communication link, although the network traffic management apparatus 12 can include other types and/or numbers of elements in other configurations.

The processor(s) 22 of the network traffic management apparatus 12 may execute programmed instructions stored in the memory 24 of the network traffic management apparatus 12 for the any number of the functions identified above. The processor(s) 22 of the network traffic management apparatus 12 may include one or more CPUs or general purpose processors with one or more processing cores, for example, although other types of processor(s) can also be used.

The memory 24 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s), can be used for the memory.

Accordingly, the memory of the network traffic management apparatus 12 can store one or more applications that can include computer executable instructions that, when executed by the network traffic management apparatus 12, cause the network traffic management apparatus 12 to perform actions, such as to transmit, receive, or otherwise process network messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. The application(s) may be running in one or more virtual machines (VMs) executing on the network traffic management apparatus 12 in some examples. Additionally, in one or more embodiments of this technology, virtual machine(s) running on the network traffic management apparatus 12 may be managed or supervised by a hypervisor.

In this particular example, the memory 24 of the network traffic management apparatus 12 includes a classification module 28, a service chain flow table 30, and service modules 32(1)-32(n), although the memory 24 can include other policies, modules, databases, or applications, for example. The classification module 28 in this example manages flow classification in order to establish and maintain service chains for flows. Accordingly, the classification module 28 applies a static policy to establish a service chain for a flow and dynamically maintain the service chain by adding or removing services according to the policy rules. The policy rules can relate to contextual information such as port number, traffic origin, or time of day as well as type of protocol, type of payload or content, or service feedback, for example, although other numbers and types of rules can also be used.

The classification module 28 can optionally maintain a service chain flow table 30 that includes identifying information for a flow (e.g., source and destination IP addresses) and an associated number of services. Accordingly, the classification module utilizes the service chain flow table 30 to steer network traffic associated with a flow according to the services of the current service chain for the flow, as described and illustrated in more detail later.

The optional service modules 32(1)-32(n) can be configured to operate on network traffic in order to provide a service as part of a service chain for a flow associated with the network traffic. The services provided by the service modules 32(1)-32(n) can include ICAP, DLP, e-mail, firewall, antivirus, and/or video compression services, for example, although any other type or number of services can also be provided in other examples.

The communication interface 26 of the network traffic management apparatus operatively couples and communicates between the network traffic management apparatus 12, the server devices 14(1)-14(n), the client devices 16(1)-16(n), and/or the service devices 18(1)-18(n), which are all coupled together by the communication network(s) 20, although other types and/or numbers of communication networks or systems with other types and/or numbers of connections and/or configurations to other devices and/or elements can also be used.

By way of example only, the communication network(s) 20 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 20 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 20 can also include direct connection(s) (e.g., for when a device illustrated in FIG. 1, such as the network traffic management apparatus 12, one or more of the client devices 16(1)-16(n), one or more of the server devices 14(1)-14(n), or one or more of the service devices 18(1)-18(n) operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory 24, communication interface 26, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one of the server devices 14(1)-14(n) or one of the service devices 18(1)18(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes processor(s), memory, and a communication interface, which are coupled together by a bus or other communication link, although other numbers and/or types of network devices could be used. The server devices 14(1)-14(n) in this example process requests received from the client devices 16(1)-16(n) via the communication network(s) 20. Various applications may be operating on the server devices 14(1)-14(n) and transmitting data (e.g., files, e-mail, or web pages) to the client devices 16(1)-16(n) via the network traffic management apparatus 12 in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage and/or otherwise coordinate operations of the other network computing devices. The server devices 14(1)-14(n) may operate as a plurality of network computing devices within a cluster architecture, a peer-to peer architecture, virtual machines, or within a cloud architecture, for example.

The technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via the communication network(s) 20. In this example, the one or more of the server devices 14(1)-14(n) operate within the memory 24 of the network traffic management apparatus 12.

The client devices 16(1)-16(n) of the network traffic management system 10 in this example include any type of computing device that can request and receive network content, such as mobile computing devices, desktop computing devices, laptop computing devices, tablet computing devices, smart phones, virtual machines (including cloud-based computers), or the like. Each of the client devices 16(1)-16(n) in this example includes a processor, a memory, and a communication interface, which are coupled together by a bus or other communication link, although other numbers and/or types of network devices could be used.

The client devices 16(1)-16(n) may run interface applications, such as standard web browsers or standalone client applications, which may provide an interface to make requests for, and receive content stored on, one or more of the server devices 14(1)-14(n) via the communication network(s) 20. The client devices 16(1)-16(n) may further include a display device, such as a display screen or touch-screen, and/or an input device, such as a keyboard for example.

The service devices 18(1)-18(n) of the network traffic management system 10 in this example include any type of computing device that can provide a service as part of a service chain for a flow, such as any of the services identified above as optionally carried out by one of the service modules 32(1)-32(n) of the network traffic management apparatus 12. Each of the service devices 18(1)-18(n) in this example includes processor(s), memory, and a communication interface, which are coupled together by a bus or other communication link, although other numbers and/or types of network devices could be used.

Accordingly, one or more of the service devices 18(1)-18(n) can operate within the network traffic management apparatus 12 itself as one of the service modules 32(1)-32(n) rather than as a stand-alone or external service device communicating with the network traffic management apparatus 12 via a communication network. In this example, the one or more of the service devices 18(1)-18(n) operate within the memory 24 of the network traffic management apparatus 12 as the service module(s) 32(1)-32(n). Other configurations and locations within the network traffic management system 10 for hosting services can also be used in other examples.

Although the exemplary network traffic management system 10 with the network traffic management apparatus 12, server devices 14(1)-14(n), client devices 16(1)-16(n), service devices 18(1)-18(n), and communication network(s) 20 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, client devices 16(1)-16(n), server devices 14(1)-14(n), or service devices 18(1)-18(n), for example, may be configured to operate as virtual instances on the same physical machine. In other words, one or more of the network traffic management apparatus 12, client devices 16(1)-16(n), server devices 14(1)-14(n), or service devices 18(1)-18(n) may operate on the same physical device rather than as separate devices communicating through communication network(s) 20. Additionally, there may be more or fewer network traffic management apparatuses, client devices, server devices, or service devices than illustrated in FIG. 1. The client devices 16(1)-16(n) could also be implemented as applications on the network traffic management apparatus 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, such as processor(s) 22, cause the processors to carry out steps necessary to implement the methods of the examples of this technology that are described and illustrated herein.

An exemplary method of improved service chain classification and management will now be described with reference to FIGS. 1-5. Referring more specifically to FIG. 3, a flowchart of an exemplary method for facilitating a service chain for flows utilizing a server-speaks-first protocol is illustrated. In step 300 in this example, the network traffic management apparatus 12 of the network traffic management system 10 receives a request from one of the client devices 16(1)-16(n) to connect to one of the server devices 14(1)-14(n). The initial connection can be a message according to the TCP protocol and subsequent requests to connect to one of the server devices 14(1)-14(n) can be made according to the TLS protocol, for example, and other types of requests to connect to one of the server devices 14(1)-14(n) can also be received in step 300.

In step 302, the network traffic management apparatus 12 establishes a corresponding connection to the one of the server devices 14(1)-14(n). In this example, the network traffic management apparatus 12 acts as a full proxy and, accordingly, terminates a connection with the one of the client devices 16(1)-16(n) and initiates a connection with the one of the server devices 14(1)-14(n). In one example, the network traffic management apparatus 12 can initiate a TCP connection with the one of the server devices 14(1)-14(n) or send a client greeting according to the TLS protocol, for example, and other methods for establishing a corresponding connection can also be used.

In step 304, the network traffic management apparatus 12 optionally establishes a service chain including service or services that are selected based on contextual information relating to the request received in step 300. Accordingly, the classification module 28 can apply a stored, static policy including a plurality of rules to classify the flow and establish an initial service chain that includes service or services likely to be appropriate for the flow. The applicable policy rules can relate to the time of day at which the request was received, the port associated with the traffic, the source IP address, or any other number or type of parameter(s).

In one example, a default service chain is established for all flows. In another example, a prior service chain corresponding to a historical flow sharing characteristics with the current flow can be re-used, and other types of classifications and service chains can be used in other examples. Optionally, the classification module 28 can populate the service chain flow table 30 with identifying information for the flow and an indication of the service or services included in the established service chain for the flow to facilitate routing or steering of subsequent network traffic associated with the flow to the service device(s) 18(1)-18(n) and/or service module(s) 32(1)-32(n) associated with the service or services in the established service chain.

In step 306, the network traffic management apparatus 12 determines whether the one of the server devices 14(1)-14(n) speaks first according to the protocol to be used within the flow subsequent to receiving the request in step 300. Accordingly, the network traffic management apparatus 12 effectively waits and probes the one of the server devices 14(1)-14(n), via establishing the corresponding connection, to determine which of the one of the client devices 16(1)-16(n) or the one of the server devices 14(1)-14(n) will communicate a message first. For example, if the connections established in step 300 and 302 are utilized to communicate TLS messages, then the one of the client devices 16(1)-16(n) will speak first using a greeting according to the TLS protocol.

However, if, in an iteration subsequent to the initial connection request, the connections established in step 300 and 302 are TLS connections utilized to communicate SMTP messages, then the one of the server devices 14(1)-14(n) will speak first according to the SMTP protocol. Other types of protocols and messages can be used in other examples. Accordingly, if the network traffic management apparatus 12 determines that the one of the server devices 14(1)-14(n) speaks first, then the Yes branch is taken to step 308.

In step 308, the network traffic management apparatus 12 inspects the message received from the one of the server devices 14(1)-14(n) to identify a service or services. For example, the network traffic management apparatus 12 may inspect the message to determine it is based on the SMTP protocol and, therefore, may identify an e-mail service, which should be included in the service chain for the flow. In this example, the network traffic management apparatus 12 may identify an ICAP service based on the inspection, which should be excluded from the service chain for the flow as it operates on HTTP messages, and not SMTP messages.

Accordingly, the network traffic management apparatus 12 then modifies the service chain established in step 304 to incorporate or remove the identified service or services. The network traffic management apparatus 12 optionally modifies an entry of the service chain flow table 30 associated with the flow to reflect the incorporation(s) or removal(s), such as by incorporating or removing network addresses for corresponding one(s) of the service devices 18(1)-18(n), for example, although other methods of modifying the service chain for the flow can also be used. Subsequent to modifying the service chain, or if the network traffic management apparatus 12 determines in step 306 that the one of the server devices 14(1)-14(n) did not speak first and the No branch is taken, the network traffic management apparatus 12 proceeds to step 310.

In step 310, the network traffic management apparatus 12 steers the message received from the one of the server devices 14(1)-14(n) and/or other received network traffic associated with the flow according to the current service chain based on the corresponding entry in the service chain flow table 30. In some examples, steps 300-308 can be repeated one or more times based on a layering of protocols (e.g., TCP, TLS or IPsec, and HTTP or SMTP), as described and illustrated in more detail with reference to FIG. 4. Accordingly, with this technology, the network traffic management apparatus 12 can dynamically alter the service chain for a flow based on a server-speaks-first protocol that may be utilized within the flow to more appropriately handle the network traffic exchanged between the one of the client devices 16(1)-16(n) and the one of the server devices 14(1)-14(n).

Figure 3:
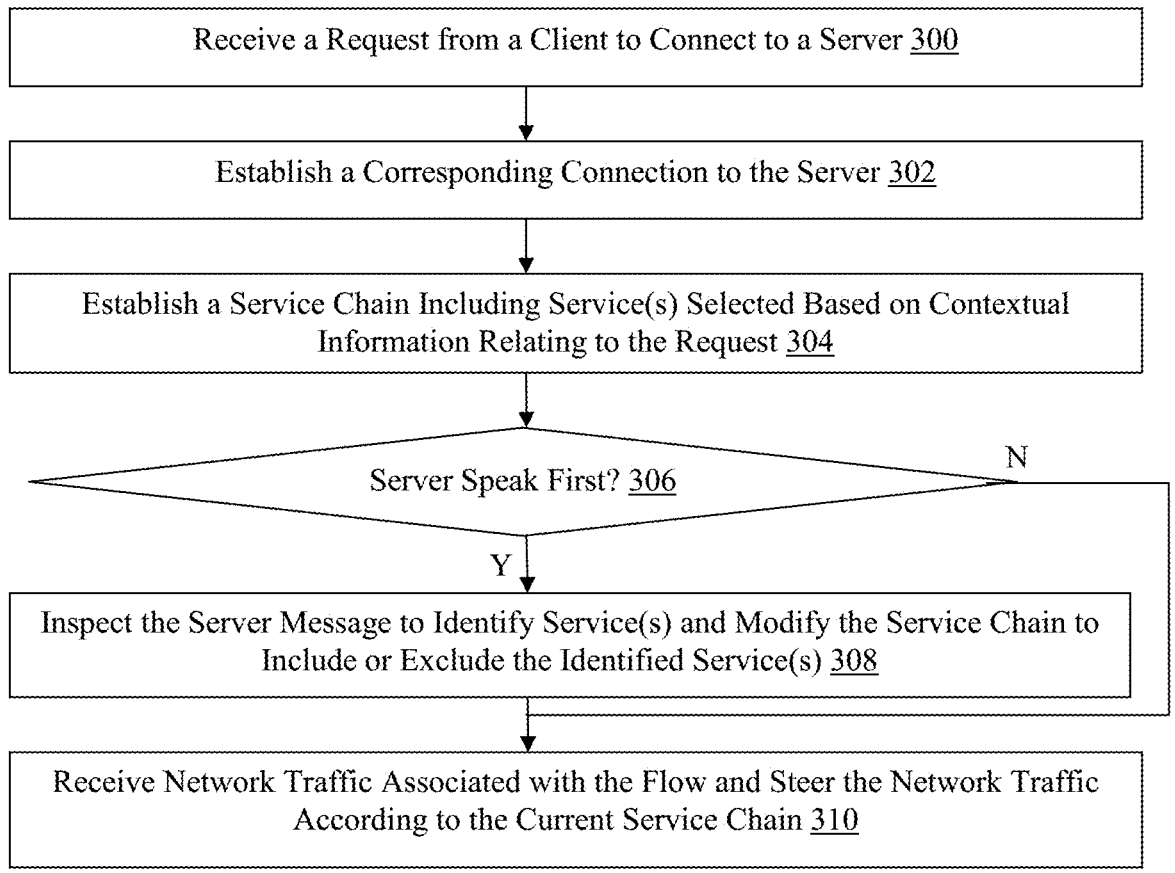
FIG. 3 is a flowchart of an exemplary method for facilitating a service chain for flows utilizing a server speaks first protocol.
Figure 4:
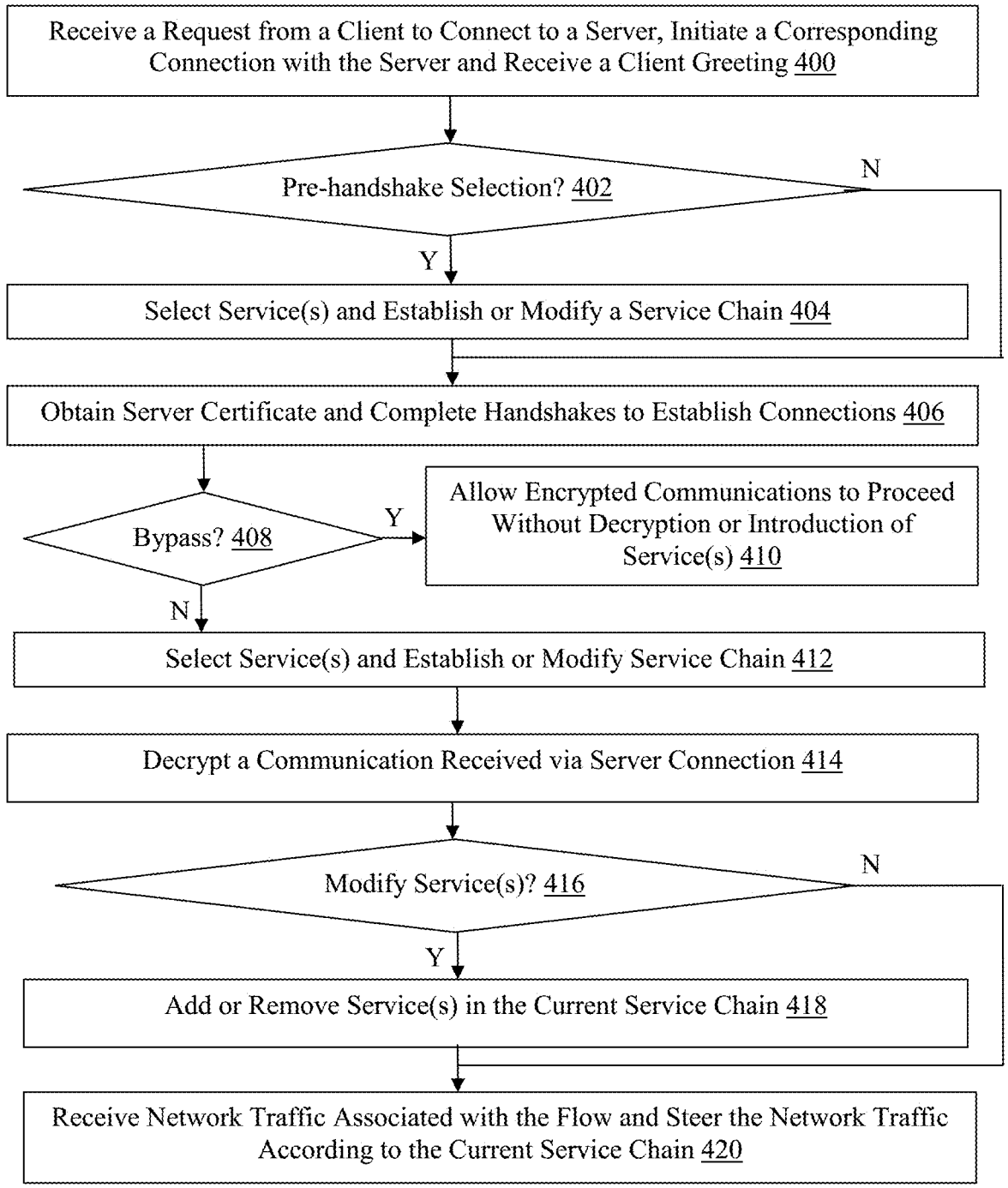
FIG. 4 is a flowchart of an exemplary method for facilitating a service chain for a flow utilizing layering of protocols, such as a security protocol encrypting communications associated with a server-speaks-first protocol.

Referring more specifically to FIG. 4, a flowchart of an exemplary method for facilitating a service chain for a flow utilizing layering of protocols, such as a security protocol encrypting communications associated with a server-speaks-first protocol, is illustrated. In step 400 in this example, the network traffic management apparatus 12 of the network traffic management system 10 receives a request from one of the client devices 16(1)-16(n) to connect to one of the server devices 14(1)-14(n), as described and illustrated in more detail earlier with reference to step 300 of FIG. 3.

The network traffic management apparatus 12 then initiates a corresponding connection with the one of the server devices 14(1)-14(n), as described and illustrated in more detail earlier with reference to step 302 of FIG. 3, and receives a client greeting from the one of the client devices 16(1)-16(n). In this example, the client greeting corresponds with the TLS protocol and is received via a TCP connection with the one of the client devices 16(1)-16(n).

In step 402, the network traffic management apparatus 12 optionally determines whether to make a pre-handshake (e.g., TLS handshake) selection of the service or services to be included in, or excluded from, the service chain for the flow. The determination in step 402 can be made by the classification module applying a stored, static policy to contextual information associated with the flow, for example. If the network traffic management apparatus 12 determines that a pre-handshake selection is to be made, then the Yes branch is taken to step 404.

In step 404, the network traffic management apparatus 12 selects the service or services to be included in, or excluded from, the service chain and establishes or modifies a service chain associated with the flow accordingly. The service or services can be selected based on the application of rules within the stored policy using contextual information or parameters associated with the flow such as the service name indication (SNI), IP addresses, or time of day, for example, although any other parameters can also be used.

The service chain can be embodied within an entry of the service chain flow table 30 correlated with identifying information for the flow, for example, although other methods of maintaining the service chain can also be used in other examples. Subsequent to establishing or modifying the service chain for the flow, or if the network traffic management apparatus 12 determines in step 402 that a pre-handshake selection of services is not to be made and the No branch is taken, the network traffic management apparatus 12 proceeds to step 406.

In step 406, the network traffic management apparatus 12 obtains a server certificate and completes handshakes to establish connections (e.g., TLS connections) with the one of the client devices 16(1)-16(n) and the one of the server devices 14(1)-14(n). Accordingly, the network traffic management apparatus 12 effectively probes for the server certificate by sending a TLS client greeting/hello to the one of the server devices 14(1)-14(n) in order to obtain the authenticated name for the one of the server devices 14(1)-14(n) included in the certificate, and subsequently completes the handshake with the one of the server devices 14(1)-14(n) to establish the connection.

In step 408, the network traffic management apparatus 12 optionally determines whether to bypass selection of services and maintaining a service chain for the flow associated with the connections established in step 406. In one example, the determination in step 408 can be made based on the authenticated server name obtained in step 406 via the server certificate, although other parameters can also be used in other examples. If the network traffic management apparatus 12 determines that selection of services for the flow should be bypassed, then the Yes branch is taken to step 410.

In step 410, the network traffic management apparatus 12 allows TLS encrypted communications associated with the flow to proceed without decryption or introduction of services. In one example, the authenticated server name retrieved from the server certificate indicates an employee credit union and the policy implemented by the classification module 28 requires that communications exchanged with the one of the server devices 14(1)-14(n) proceed without stripping the TLS encryption in order to maintain employee confidentiality and security.

Since the TLS encryption is not stripped in this example, there would be no need for a service chain to be associated with the flow. Other types of parameters and reasons for bypassing service chain classification for a flow can be used in other examples. However, referring back to step 408, if the network traffic management apparatus 12 determines that selection of services for the flow should not be bypassed, then the No branch is taken to step 412.

In step 412, the network traffic management apparatus 12 optionally classifies the flow by selecting the service or services and establishing or modifying the service chain for the flow. The classification can be based on contextual information or parameters available prior to stripping the TLS encryption from any communications associated with the flow, for example. The service chain can optionally be established or modified using the service chain flow table 30, for example, although other methods of maintaining the service chain in step 412 can also be used.

In step 414, the network traffic management apparatus 12 decrypts a communication received via the TLS connection with the one of the server devices 14(1)-14(n). In this particular example, the network traffic management apparatus 12 strips the TLS encryption to obtain an SMTP message from the one of the server devices 14(1)-14(n), which communicated the message based on the server-speaks-first SMTP protocol. Other types of protocols can be used for the encrypted messages, including client-speaks-first protocols in other examples.

In step 416, the network traffic management apparatus 12 determines whether any service or services should be added or removed from the current service chain based on an inspection of the decrypted communication. The determination can be based on an application of rules within a stored policy by the classification module 28, for example. If the network traffic management apparatus 12 determines that the service chain for the flow should be modified, then the Yes branch is taken to step 418.

In step 418, the network traffic management apparatus 12 adds or removes the service or services in the current service chain, such as by manipulating the service chain flow table, for example. In this particular example, an e-mail service would be added to the current service chain since the decrypted communication corresponds with the SMTP protocol. Other types of services can be added or removed in other examples. Subsequent to modifying the service chain for the flow in step 418, or if the network traffic management apparatus 12 determines in step 416 that the current service chain should not be modified and the No branch is taken, the network traffic management apparatus 12 proceeds to step 420.

In step 420, the network traffic management apparatus 12 receives network traffic associated with the flow and steers the network traffic according to the current service chain, optionally using the service chain flow table 30. Accordingly, the network traffic management apparatus 12 strips the TLS encryption from subsequent communications received via the connections established in step 406 and routes the resulting messages to the service device(s) 18(1)-18(n) and/or server module(s) 32(1)-32(n) associated with the services included in the current service chain, as identified in the service chain flow table 30, for example.

Figure 5:
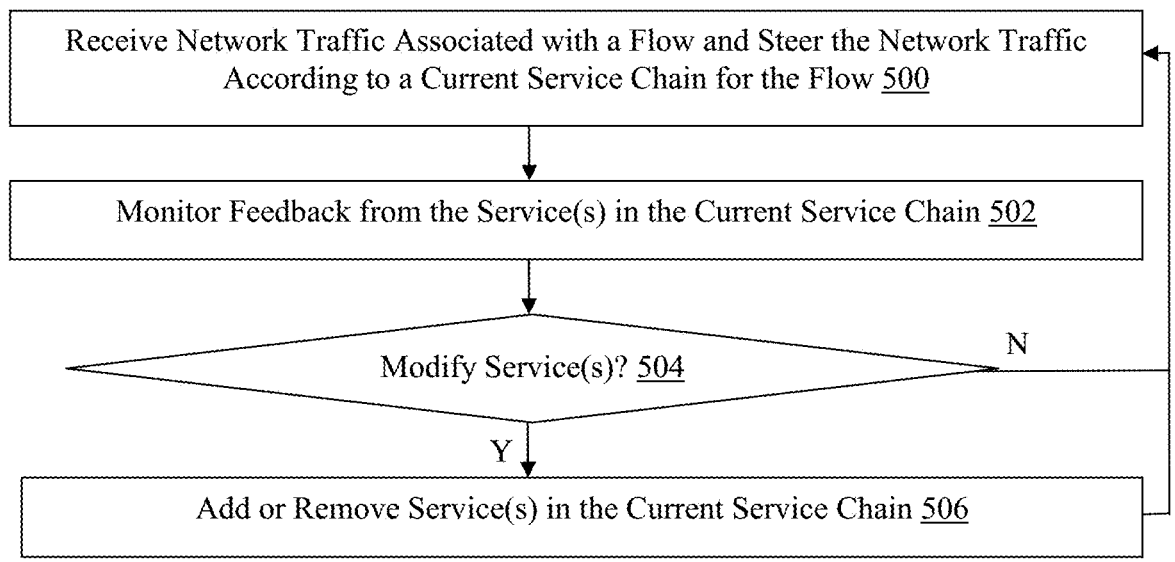
FIG. 5 is a flowchart of an exemplary method for facilitating a dynamic service chain for a flow.

Referring more specifically to FIG. 5, a flowchart of an exemplary method for facilitating a dynamic service chain for a flow is illustrated. In step 500 in this example, the network traffic management apparatus 12 of the network traffic management system 10 receives network traffic associated with a flow and steers the network traffic according to a current service chain for the flow. The service chain for the flow could have been established and/or maintained as described and illustrated in more detail earlier with reference to steps 300-308 of FIG. 3 or steps 400-418 of FIG. 4, and the network traffic associated with the flow could have been received and steered as described and illustrated in more detail earlier with reference to step 310 of FIG. 3 or step 420 of FIG. 4, for example.

In step 502, the network traffic management apparatus 12 monitors feedback from one or more of the service or services in the current service chain for the flow. In one particular example, an ICAP service executing on one of the service devices 18(1)-18(n) may communicate to the network traffic management apparatus 12 that content included in HTTP message(s) is video. Other types of feedback from other types or number of services can also be monitored by the network traffic management apparatus 12 in other examples.

In step 504, the network traffic management apparatus 12 determines whether any service or services in the current service chain for the flow should be modified based on the monitoring. In this example, the network traffic management apparatus 12 may determine that a video compression service executing on one of the service modules 32(1)-32(n) should be included, or effectively spliced or incorporated into, the service chain for the flow since the content being transmitted is video content according to the feedback from the ICAP service. Other types of service chain modifications can also be made in other examples. Accordingly, if the network traffic management apparatus 12 determines that the service chain should be modified, then the Yes branch is taken to step 506.

In step 506, the network traffic management apparatus 12 incorporates or removes service or services from the current service chain for the flow, such as by modifying an entry for the flow in the service chain flow table 30, for example. In this example, the network traffic management apparatus 12 may modify the entry of the service chain flow table 30 corresponding to the flow to insert network address information for the video compression service executing on the one of the service modules 32(1)-32(n) so that subsequent received network traffic associated with the flow is steered to the video compression service as part of the service chain for the flow.

While the service chain in this particular example is dynamic based on feedback from a service within the service chain, other types of information can be used (e.g., an inspection of network traffic payloads) in order to modify a service chain for a particular flow according to a stored policy. Subsequent to modifying the service chain in step 506, or if the network traffic management apparatus 12 determines in step 504 that the service chain does not require modification and the No branch is taken, the network traffic management apparatus 12 proceeds back to step 500 and continues to receive and steer network traffic associated with the flow.

With this technology, service chains for flows can be established or modified to account for server-speaks-first protocols, as well as protocols that may be used inside other connections or protocols, such as secure or encrypted connections. Additionally, service chains can be dynamically modified and maintained based on feedback from various services included in a current service chain. Accordingly, network traffic can be advantageously processed and steered according to services within an associated service chain that more accurately reflect the communications occurring within flows, resulting in improved management of the network traffic.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for service chain management implemented by a network traffic management system comprising one or more network traffic management apparatuses, service devices, client devices, or server devices, the method comprising:

establishing a first connection with a client and a second connection with a server after receiving a request from the client, wherein the first and second connections are associated with a flow between the client and the server;

establishing a service chain for the flow, wherein the service chain includes a plurality of services;

using a message received from the server via the second connection to determine the flow uses a server-speaks-first protocol;

in response to determining the flow uses the server-speaks-first protocol, using the message from the server to identify a service to add to or remove from the established service chain;

adding the identified service to, or removing the identified service from, the established service chain to generate a modified service chain for the flow; and steering the inspected message, or other received network traffic associated with the flow, according to the modified service chain.

2. The method of claim 1, further comprising adjusting the service chain to incorporate or remove another service based on feedback received from one or more services of the established or modified service chain.

3. The method of claim 1, further comprising:
obtaining a certificate from the server subsequent to receiving a client greeting according to a transport layer security (TLS) protocol;
determining, based on the certificate, whether to bypass selection of services for the flow; and
allowing encrypted communications between the client and server associated with the flow, when the determination indicates the selection of services should be bypassed.

4. The method of claim 1, further comprising establishing the service chain to include one or more services subsequent to receiving the request from the client, and prior to receiving the inspected message from the server.

5. A network traffic management apparatus, comprising memory comprising programmed instructions stored thereon and one or more processors configured to be capable of executing the stored programmed instructions to:
establish a first connection with a client and a second connection with a server after receiving a request from the client, wherein the first and second connections are associated with a flow between the client and the server;
establish a service chain for the flow, wherein the service chain includes a plurality of services;
using a message received from the server via the second connection to determine the flow uses a server-speaks-first protocol;
in response to determining the flow uses the server-speaks-first protocol, use the message from the server to identify a service to add to or remove from the established service chain;
add the identified service to, or remove the identified service from, the established service chain to generate a modified service chain for the flow; and
steer the inspected message, or other received network traffic associated with the flow, according to the modified service chain.

6. The network traffic management apparatus of claim 5, wherein the one or more processors are further configured to be capable of executing the stored programmed instructions to adjust the service chain to incorporate or remove another service based on feedback received from one or more services of the established or modified service chain.

7. The network traffic management apparatus of claim 5, wherein the one or more processors are further configured to be capable of executing the stored programmed instructions to:
obtain a certificate from the server subsequent to receiving a client greeting according to a transport layer security (TLS) protocol;
determine, based on the certificate, whether to bypass selection of services for the flow; and
allow encrypted communications between the client and server associated with the flow, when the determination indicates the selection of services should be bypassed.

8. The network traffic management apparatus of claim 5, wherein the one or more processors are further configured to be capable of executing the stored programmed instructions to establish the service chain to include one or more services subsequent to receiving the request from the client, and prior to receiving the inspected message from the server.

9. A non-transitory computer readable medium having stored thereon instructions for service chain management comprising executable code which when executed by one or more processors, causes the one or more processors to:
establish a first connection with a client and a second connection with a server after receiving a request from the client, wherein the first and second connections are associated with a flow between the client and the server;
establish a service chain for the flow, wherein the service chain includes a plurality of services;
use a message received from the server via the second connection to determine the flow uses a server-speaks-first protocol;
in response to determining the flow uses the server-speaks-first protocol, use the message from the server to identify a service to add to or remove from the established service chain;
add the identified service to, or remove the identified service from, the established service chain to generate a modified service chain the flow; and
steer the inspected message, or other received network traffic associated with the flow, according to the modified service chain.

10. The non-transitory computer readable medium of claim 9, wherein the executable code when executed by the one or more processors further causes the one or more processors to adjust the service chain to incorporate or remove another service based on feedback received from one or more services of the established or modified service chain.

11. The non-transitory computer readable medium of claim 10, wherein the executable code when executed by the one or more processors further causes the one or more processors to:
obtain a certificate from the server subsequent to receiving a client greeting according to a transport layer security (TLS) protocol;
determine, based on the certificate, whether to bypass selection of services for the flow; and
allow encrypted communications between the client and server associated with the flow, when the determination indicates the selection of services should be bypassed.

12. The non-transitory computer readable medium of claim 9, wherein the executable code when executed by the one or more processors further causes the one or more processors to establish the service chain to include one or more services subsequent to receiving the request from the client, and prior to receiving the inspected message from the server.

13. A network traffic management system, comprising one or more network traffic management apparatuses, service devices, client devices, or server devices with memory comprising programmed instructions stored thereon and one or more processors configured to be capable of executing the stored programmed instructions to:
establish a first connection with a client and a second connection with a server after receiving a request from the client, wherein the first and second connections are associated with a flow between the client and the server;
establish a service chain for the flow, wherein the service chain includes a plurality of services;
use a message received from the server via the second connection to determine the flow uses a server-speaks-first protocol;
in response to determining the flow uses the server-speaks-first protocol, use the message from the server to identify a service to add to or remove from the established service chain;

add the identified service to, or remove the identified service from, the established service chain to generate a modified service chain for the flow; and steer the inspected message, or other received network traffic associated with the flow, according to the modified service chain.

14. The network traffic management system of claim 13, wherein the one or more processors are further configured to be capable of executing the stored programmed instructions to adjust the service chain to incorporate or remove another service based on feedback received from one or more services of the established or modified service chain.

15. The network traffic management system of claim 14, wherein the one or more processors are further configured to be capable of executing the stored programmed instructions to:

obtain a certificate from the server subsequent to receiving a client greeting according to a transport layer security (TLS) protocol;

determine, based on the certificate, whether to bypass selection of services for the flow; and allow encrypted communications between the client and server associated with the flow, when the determination indicates the selection of services should be bypassed.

16. The network traffic management system of claim 13, wherein the one or more processors are further configured to be capable of executing the stored programmed instructions to establish the service chain to include one or more services subsequent to receiving the request from the client, and prior to receiving the inspected message from the server.

17. The method of claim 1, wherein the service chain is established based at least on an origin of the client.

18. The network traffic management apparatus of claim 5, wherein the service chain is established based at least on an origin of the client.

19. The non-transitory computer readable medium of claim 9, wherein the service chain is established based at least on an origin of the client.

20. The network traffic management system of claim 13, wherein the service chain is established based at least on an origin of the client.

* * * * *